(No Model.)

A. A. HOUGHTON.
PROCESS OF AND APPARATUS FOR DRAWING GLASS TUBING.

No. 593,581.  Patented Nov. 16, 1897.

Witnesses
Jas. W. Walker.
John W. Thomas.

Inventor
Arthur A. Houghton
by Vernon M. Dorsey
his Attorney

United States Patent Office.

ARTHUR A. HOUGHTON, OF CORNING, NEW YORK.

PROCESS OF AND APPARATUS FOR DRAWING GLASS TUBING.

SPECIFICATION forming part of Letters Patent No. 593,581, dated November 16, 1897.

Application filed May 26, 1897. Serial No. 638,271. (No model.)

*To all whom it may concern:*

Be it known that I, ARTHUR A. HOUGHTON, a citizen of the United States, residing at Corning, in the county of Steuben and State of New York, have invented certain new and useful Improvements in Processes of and Apparatus for Drawing Glass Tubing; and I do hereby declare the following to be a full, clear, and exact description of the invention, such as will enable others skilled in the art to which it appertains to make and use the same.

In the manufacture of glass tubing as now usually carried on, and especially in those classes thereof in which accuracy and uniformity are necessary, as in thermometer-tubing, a large proportion of the finished product is defective and must be rejected. These defects may be, generally speaking, divided into two classes. The first of such classes are those which are caused from defects in the blank from which the tube is drawn incident to the manner in which the blank is formed, while the second class arise in the process of drawing out the blank into the tube.

My present invention has for its object to avoid the class of defects last named.

As is well known, in the usual process of drawing tubes a suitable blank having been formed and brought to the requisite degree of heat upon the end of a blow-iron in the hands of a workman, another workman presses a pontil-iron having a small quantity of glass upon its end upon the free end of the blank. The operators then move away from each other, drawing out the blank into a tube. As in this process the tube is drawn horizontally it is subjected to gravity acting at right angles to its axis, causing the tube to sag, whereby the finished tube is given a curve, and the same force causes an uneven flow and distribution of glass in the walls of the tube, resulting in inaccuracies and the loss of the advantages sought to be obtained by perfecting the blank. Other causes of malformation of the finished tube are the uneven and irregular tension or pull exerted by the operators in drawing and the twisting of the irons in their hands. To avoid these deleterious results, I have invented a process of drawing out the blanks into tubes and a convenient apparatus for carrying out the said process, and these form the subject-matter of this my present application.

Figure 1:
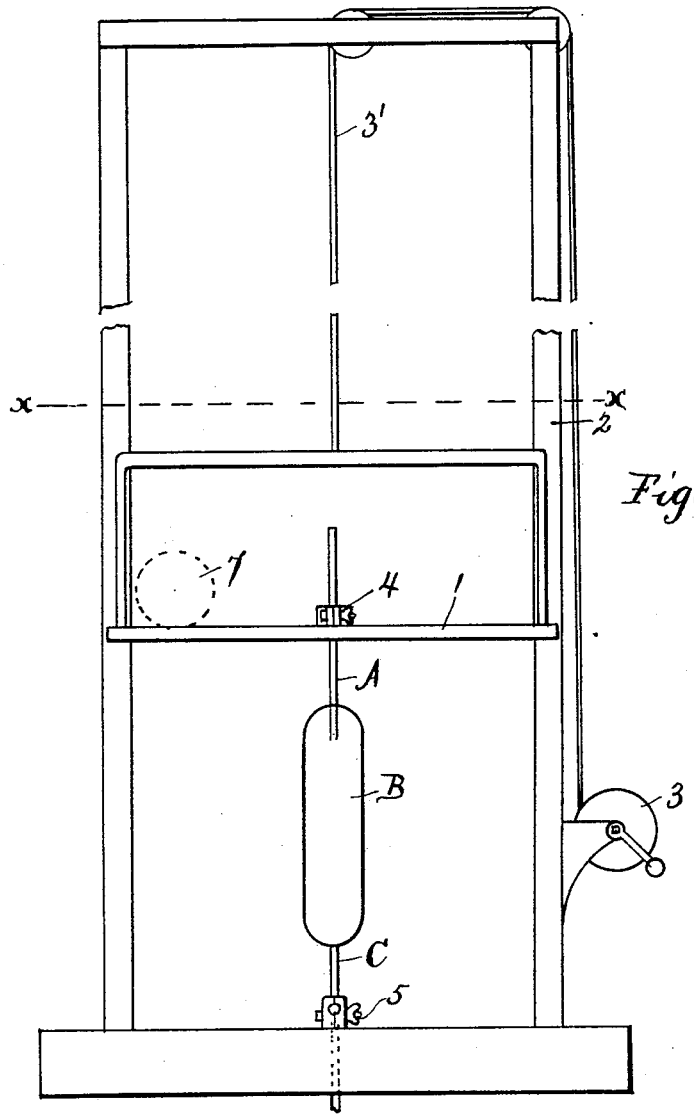
Figure 2:
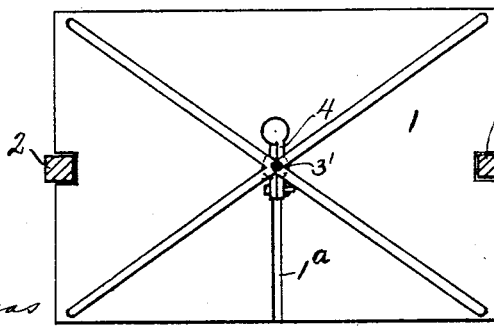

Referring to the accompanying drawings, in which corresponding parts are designated by corresponding marks of reference, Figure 1 is an elevation of a device invented by me for carrying out my improved process. Fig. 2 is a plan view on line $x\ x$ of Fig. 1.

In carrying out my present process, after the proper blank has been formed, instead of drawing it out horizontally I draw it out vertically, so that the tension or strain exerted thereon and the axis of the tube formed thereby coincide with the direction of gravity, whereby the injurious effects of gravity in the process of horizontal drawing, as above stated, are obviated.

I will now describe one form of apparatus I have invented to carry out this process, and in so doing will describe more specifically the various steps involved in the process, although it will be obvious that other forms of apparatus may be used in carrying it out.

A frame 1 is mounted between the guides 2, motion being imparted to the frame by any suitable actuating mechanism, such as the windlass 3 and rope 3' shown in the drawings, and it may be stated that to obtain the best results the actuating mechanism for the frame should be of such a character as to permit a steady and uniform strain to be placed thereon. A suitable clamp 4 is secured upon the frame and is adapted to hold the blowpipe, while a fixed clamp 5, mounted on a crosshead, (which may form, as shown, the base of the guides,) is adapted to hold a pontil-iron. Such being the construction, a blowpipe A, having a heated blank B on the lower end thereof, is clamped to the frame 2 and the frame lowered until the blank has adhered to the pontil-iron C, held in the clamp 5. The frame is now raised and the blank drawn out into tubing. The pontil-iron is then detached from the lower end of the tube thus formed and the tube lowered and cut into sections of the desired length.

It will be obvious that there can be in this process of forming tubes no twisting, as the irons are firmly secured in place before they are connected by the blank. It has been further found that the glass of the blank when drawn vertically flows more evenly and retains the form of the blank better than in the old way of drawing horizontally. This is of the greatest importance in the manufacture of the so-called "lens-front tubing," in which the magnification is dependent on the thickness of the walls of the tube and the angle formed by the front faces thereof. It is obvious that unless this uniformity in the flow of the glass can be obtained any attempt to regulate the shape of the finished tubing by the shape of the blank will be wholly or in a great measure unsuccessful. Thus by my invention while the quality of the output is much improved the cost thereof is reduced. It is also obvious that many modifications may be made. For instance, the frame may be lowered instead of raised in drawing out the tube. The pontil-iron instead of the blowpipe may be carried by the frame, or the frame may carry a suitable receptacle, such as is indicated in dotted lines at 7, for air under pressure, which, if desired, can be permitted to flow through the pontil-iron into the interior of the blank while the latter is being drawn. These modifications are immaterial and are mentioned merely to illustrate the general scope of my invention, but I do not confine myself thereto or to any of them. It will be seen, however, in any event, irrespective of whether it be the upper tool that is raised or the lower tool that is drawn down, that the blank will rest upon the lower tool, and that as the opposite tools are drawn apart the blank will be drawn out from the central portion at a rate proportional to the speed the tools are separated, and as each portion of the blank is reduced to approximately the right diameter and thickness it will harden, and this drawing in a vertical direction at a controllable speed, whereby the diameter of the finished tubing is regulated, is an important element in my improved process, as were the blanks merely drawn vertically by their weight alone there would be no way to control the drawing, and tubing of irregular shape would be produced.

Having thus described my invention, what I claim, and desire to secure by Letters Patent, is—

1. The hereinbefore-described process of drawing glass tubes, which consists in forming a hollow blank and drawing out the said blank in a vertical direction, at a controllable speed, whereby the blank is drawn out into a uniform tube, substantially as described.

2. The hereinbefore-described process of forming glass tubes, which consists in forming a hollow blank upon the end of a blowpipe; securing the pipe against twisting, attaching the free end of the blank to a pontil-iron held against twisting, and separating the pontil and blowpipe vertically, substantially as described.

3. In a device for drawing glass tubes, from hollow blanks, the combination with vertical guides, of a cross-head, a frame moving in the guides, the cross-head and frame being adapted to be secured to the opposite ends of the blank, and means for moving the frame away from the cross-head, substantially as described.

4. In a device for drawing glass tubes, from hollow blanks, the combination with a frame and a cross-head to hold the opposite ends of a blank, the one located above the other, of means for moving the frame vertically and away from the cross-head, substantially as described.

In testimony whereof I affix my signature in presence of two witnesses.

ARTHUR A. HOUGHTON.

Witnesses:
WALDOLF WILLARD,
E. B. SEYMOUR.